(54) INFORMATION STORAGE DEVICE HAVING UNIAXIAL TRACKING MECHANISM WITH DECELARATION CONTROL

(75) Inventors: Takayuki Kawabe, Kawasaki (JP); Ichiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/495,233

(22) Filed: Jan. 31, 2000

(30) Foreign Application Priority Data

Mar. 31, 1999 (JP) .......................................... 11-093547

(51) Int. Cl.⁷ ................................................. G11B 7/00
(52) U.S. Cl. .................................................. 369/44.28
(58) Field of Search ........................... 369/44.28, 44.29, 369/47.38, 44.27, 44.14, 44.21, 44.22, 44.34, 30.15, 30.17, 30.13; 360/78.05, 78.06

(56) References Cited

U.S. PATENT DOCUMENTS

| | | | | |
|---|---|---|---|---|
| 5,111,349 A | * | 5/1992 | Moon | 360/78.07 |
| 5,121,370 A | * | 6/1992 | Yanagi | 369/44.28 |
| 5,457,671 A | * | 10/1995 | Takata et al. | 369/44.28 |
| 5,499,230 A | * | 3/1996 | Yanagi | 369/124 |
| 5,577,009 A | * | 11/1996 | Takamine | 369/44.28 X |
| 5,581,521 A | * | 12/1996 | Nomura et al. | 369/44.35 |
| 5,598,304 A | * | 1/1997 | Choi et al. | 360/78.04 |
| 5,598,396 A | * | 1/1997 | Horibe et al. | 369/44.34 X |
| 5,604,720 A | * | 2/1997 | Kimura et al. | 369/44.28 |
| 5,675,562 A | * | 10/1997 | Yanagi | 369/44.28 |
| 5,699,332 A | * | 12/1997 | Nakano | 369/44.28 |
| 5,802,024 A | * | 9/1998 | Saga | 369/44.29 |
| 6,154,425 A | * | 11/2000 | Iida et al. | 369/44.29 |
| 6,157,599 A | * | 12/2000 | Yamashita et al. | 369/44.28 |
| 6,310,851 B1 | * | 10/2001 | Tobita et al. | 369/111 |

FOREIGN PATENT DOCUMENTS

| | | |
|---|---|---|
| JP | 63-197073 | 8/1988 |
| JP | 1-260679 | 10/1989 |
| JP | 2-79223 | 3/1990 |
| JP | 3037876 | 2/1991 |
| JP | 9081940 | 3/1997 |
| JP | 9102135 | 4/1997 |

* cited by examiner

Primary Examiner—Thang V. Tran
(74) Attorney, Agent, or Firm—Greer, Burns & Crain, Ltd.

(57) ABSTRACT

An information storage device having a uniaxial tracking mechanism as a pickup which can perform a stable track pull-in operation is provided. A deceleration pulse amplitude á supplied to a tracking actuator is determined from a linear function á=K(V−V0) of a detected movement velocity of a beam in the vicinity of a target track. The deceleration pulse amplitude is divided into two, and is supplied to the tracking actuator on two different occasions.

11 Claims, 6 Drawing Sheets

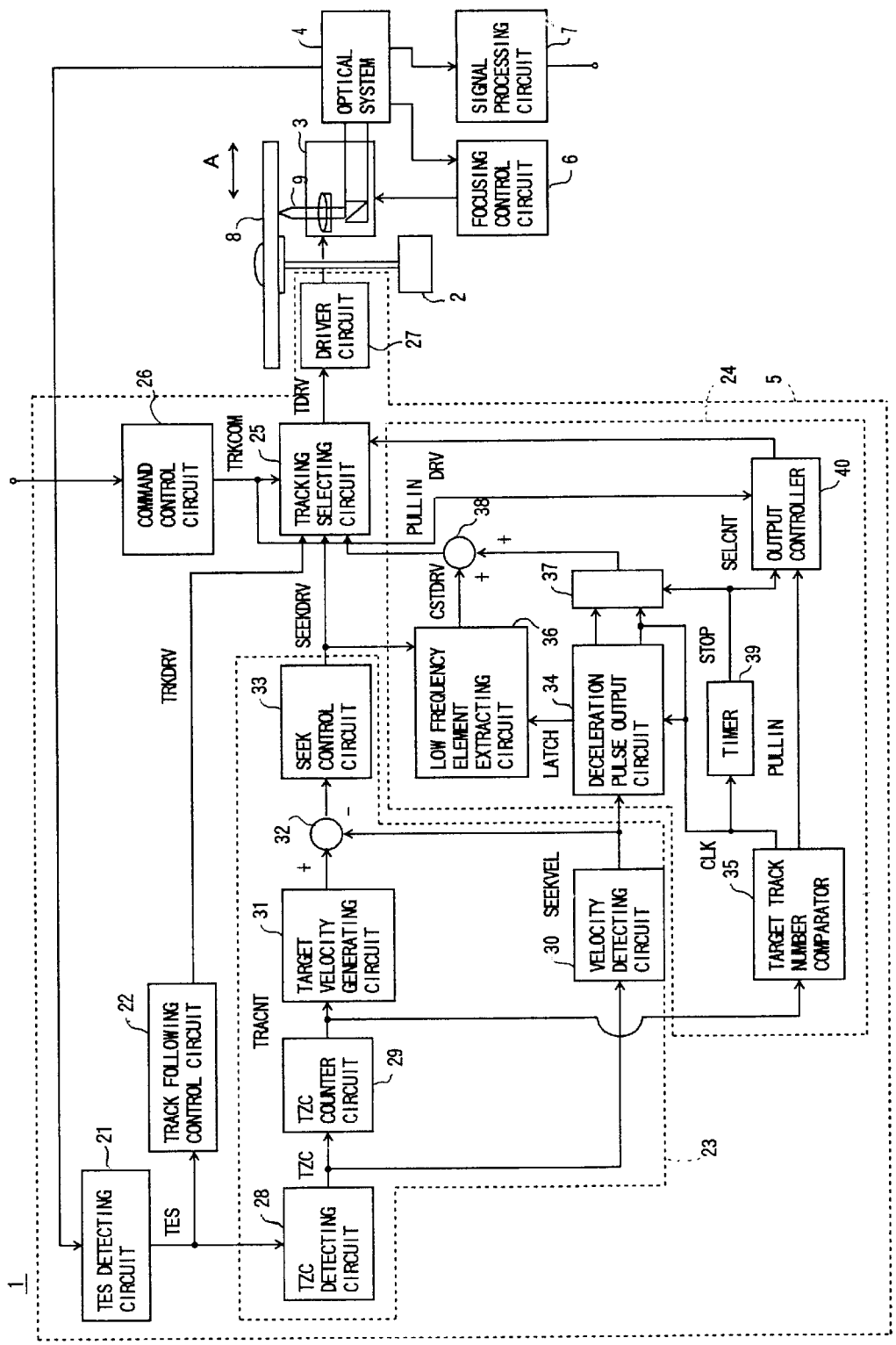
F I G. 1

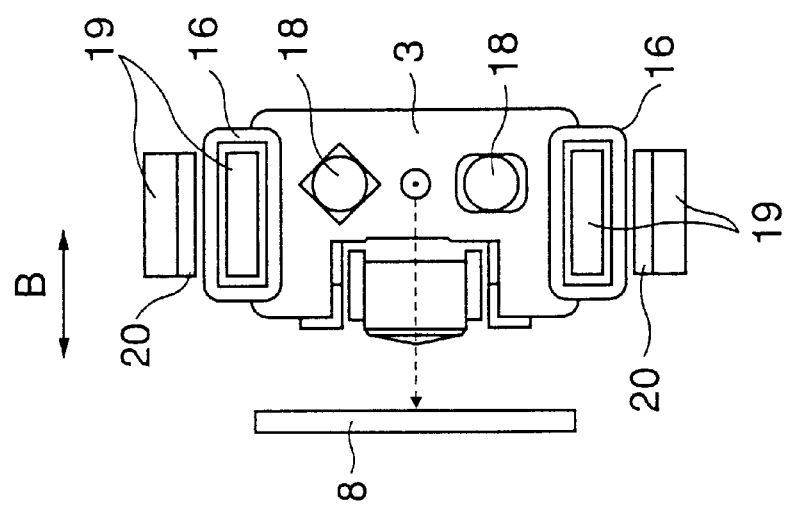
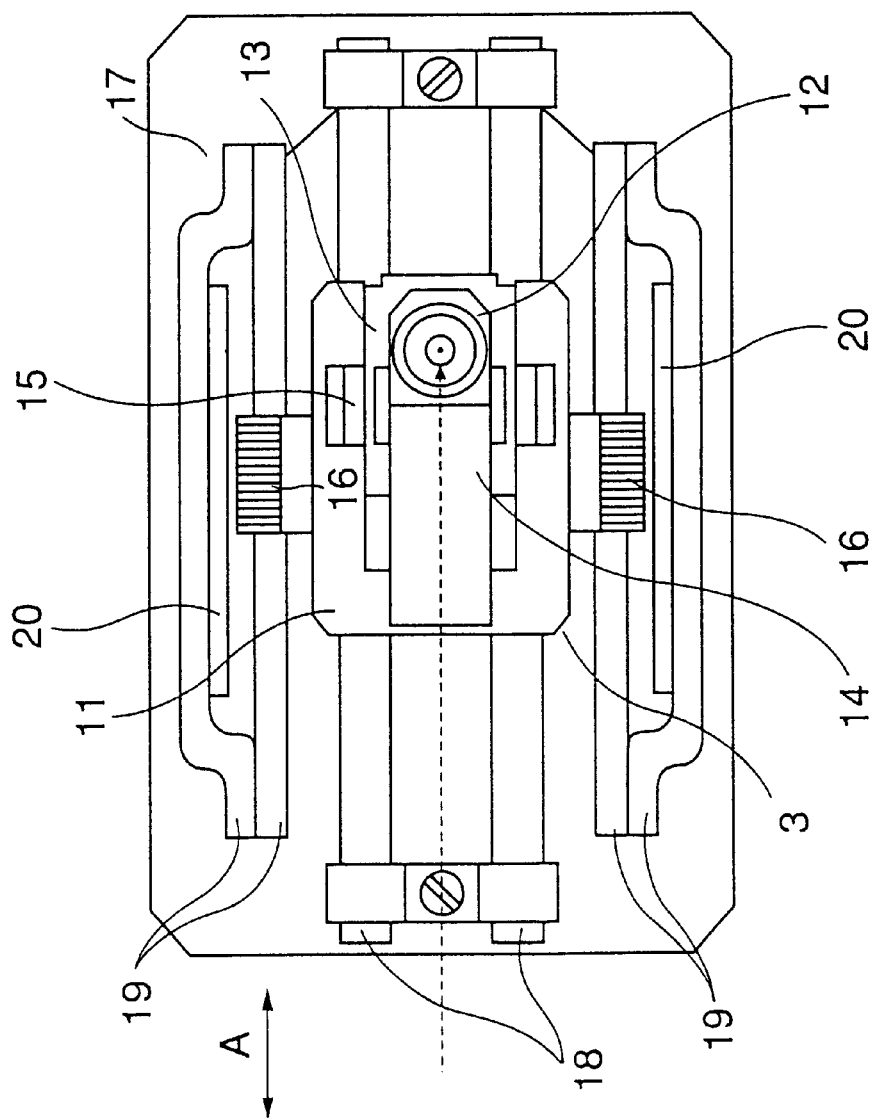

F I G. 3
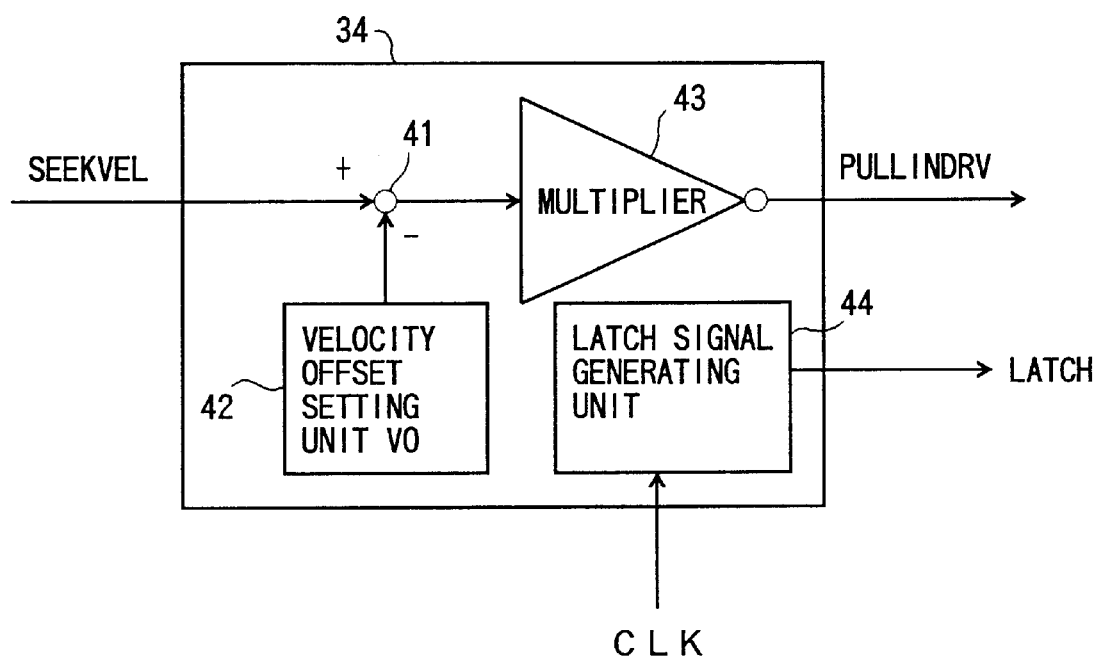

FIG.4

| TRK_COM | PULLIN | STOP | SELCNT | TDRV |
|---|---|---|---|---|
| LOW | - | - | 0 | TRKDRV |
| HIGH | LOW | - | 1 | SEEKDRV |
| HIGH | HIGH | LOW | 2 | PULLINDRV |
| HIGH | LOW | HIGH | 0 | TRKDRV |

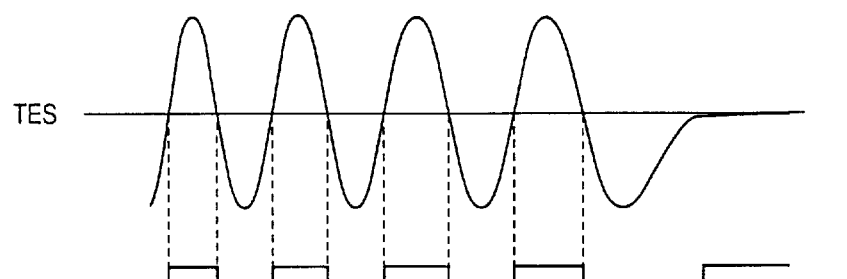
FIG.5A  TES
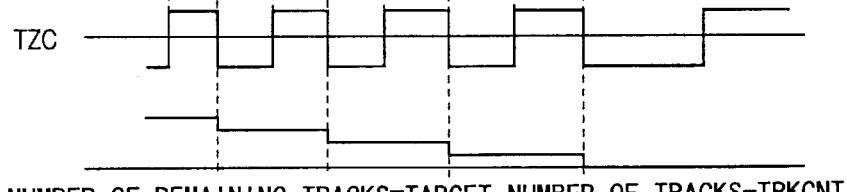
FIG.5B  TZC
FIG.5C
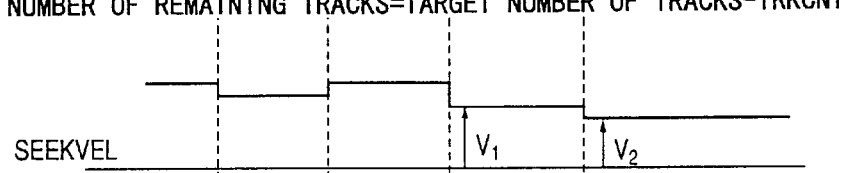
NUMBER OF REMAINING TRACKS=TARGET NUMBER OF TRACKS-TRKCNT
FIG.5D  SEEKVEL
FIG.5E  TDRV
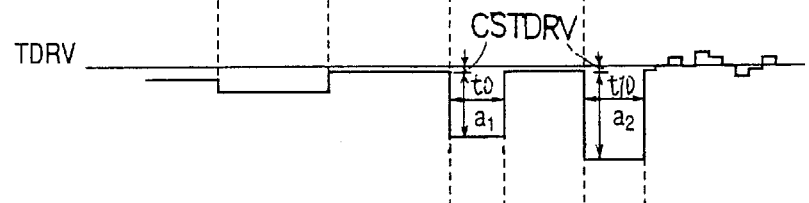
FIG.5F  PULLIN   LOW   HIGH   LOW
FIG.5G  STOP   LOW   t0   t10   HIGH
FIG.5H  SELCNT   1   2   3
FIG.5 I
FIG.5J
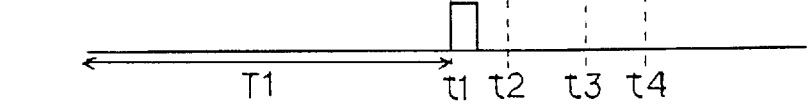
T1  t1 t2  t3 t4

INFORMATION STORAGE DEVICE HAVING UNIAXIAL TRACKING MECHANISM WITH DECELARATION CONTROL

BACKGROUND OF THE INVENTION

1. Field of the Invention

The present invention generally relates to information storage devices, and, more particularly, to an information storage device having a uniaxial tracking mechanism as a pickup.

When performing a pull-in operation to move from a seek control operation to a track following control operation in an optical disk device, the velocity of the objective lens is measured to determine a deceleration current. The deceleration current is then outputted so that the velocity is lowered enough to perform a stable track pull-in operation. After that, the operation is switched to the track following control operation.

Meanwhile, to lower the cost of the device, a digital servo system using MPU or DSP is used for controlling a beamspot tracking mechanism, and a uniaxial system is employed for the tracking mechanism.

In view of this, it is necessary to develop a control method suitable for sampling operations, and also, it is necessary to achieve steadier track pull-in operations.

2. Description of the Related Art

As mentioned above, in a pull-in operation to move from a seek control operation to a track following control operation in an optical disk device, the velocity of the objective lens is measured to determine a deceleration current. The deceleration current is then outputted so that the velocity is lowered enough to perform a stable track pull-in operation. After that, the operation is switched to the track following control operation.

To perform a stable track pull-in operation, the pulse height of a deceleration pulse, i.e., an acceleration á, and the pulse width, i.e., a time t, can be determined using the following equations:

$$t = 2d/v \quad (1)$$

$$á = v^2/2d \quad (2)$$

wherein d is the remaining distance to a target track, and v is the velocity at the time of pull-in start. Japanese Laid-Open Patent Application No. 3-37876 discloses this method in detail.

In recent years, a tracking control operation for an optical disk device has been performed more and more often by a digital arithmetic unit, such as DSP (Digital Signal Processor), to lower the cost. In such a case, control output is carried out in predetermined sampling cycles. Even if the pulse width t is determined from the velocity v at the pull-in starting time, the resolution is determined by the control sampling cycles of the DSP.

For instance, in a case where a deceleration pulse is outputted at v=8.3 mm/s and at a point half a track before a target track in a 1.1-μm track-pitch optical disk medium, the deceleration pulse height, i.e., the acceleration á, can be determined from the equation (2) as:

$$á = -62.6 [m/s^2]$$

The deceleration pulse width, i.e., the time t, can be determined from the equation (1) as:

$$t = 132.5 \mu s$$

If sampling is performed at a frequency of 60 kHz, the time t is equivalent to 7.95 cycles. Accordingly, a 7-cycle deceleration pulse is outputted.

Since 7 cycles are equivalent to the time t=116.7 μs, only a deceleration velocity v=át=7.3 mm/s is obtained. For an intended deceleration velocity v of 8.3 mm/s, a residual velocity of 1.0 mm/s is caused. This residual velocity adversely affects the stability in the track pull-in operation.

In an actual device, the velocity v is determined by measuring the cycle T of a tracking error signal and dividing the track pitch p by the cycle T. Accordingly, the velocity v can be expressed as:

$$v = p/T \quad (3)$$

From the equation (3), the time t can be expressed as:

$$T = 2dT/p \quad (4)$$

From the equation (4), the acceleration a can be expressed as:

$$á = p^2/(2dT^2) \quad (5)$$

If noise exists in a tracking error signal, an error is caused in a measured value of the cycle T. The error of the cycle T affects the pulse width t of the deceleration pulse based on the equation (4) and also the acceleration á based on the equation (5). Here, the acceleration á is in inverse proportion to the square of T. For this reason, the error greatly affects the acceleration á, and hinders accurate control operations. Conventionally, a decelerating operation is carried out by a single deceleration pulse having the pulse width t and the pulse height á determined by the equations (4) and (5).

A suitable point to detect the present position of a beam spot in the vicinity of a target track in a seek control operation is half a track before the target track. In a case where the medium has a 1.1-μm pitch, for instance, the suitable beam-spot detecting position is 0.55 μm before a target track.

In a case where the velocity v at the starting time of a track pull-in operation is 8.0 mm/s, to reduce the velocity v to 0 mm/s while moving half a track, a deceleration pulse having a pulse width of 137.5 μs and a pulse height of 58.2 m/s² is required. In a uniaxial tracking mechanism, the acceleration ability is low, and it is extremely difficult to obtain such a high acceleration. To lower the acceleration, the velocity v at the starting time of a track pull-in operation must be lowered. However, if the velocity is too low, the seek velocity control becomes unstable.

There is a method in which a remaining distance d to a target track is made longer so as to maintain a low acceleration, i.e., a pull-in deceleration pulse is outputted one track or 1.5 tracks before the target track. For instance, Japanese Laid-Open Patent Application No. 9-81940 discloses a method in which deceleration is started one track before a target track. In such a method, however, the deceleration pulse width t is larger, and if there is an error in the acceleration mechanism of the tracking actuator or if turbulence is externally caused during a decelerating operation, any of those changes cannot be accommodated. To solve such a problem, there is a method in which a deceleration pulse having a smaller width t is employed. However, this method also has a problem that the residual velocity at the starting time of a deceleration pulse cannot be made high enough to perform stable seek operations. Japanese Laid-Open Patent Application No. 9-102135 suggests a method in which a deceleration pulse is outputted one track before a target track, and the height of the deceleration pulse is then corrected half a track before the target track. In this method, however, an accurate velocity cannot be detected from a tracking error signal half a track before a target track, because deceleration is caused by the deceleration pulse. In Japanese Laid-Open Patent Application No. 9-102135, for instance, the track pitch is divided by the zero-cross cycle of a tracking error signal to obtain a velocity detection value VDET. However, since the obtained VDET is the mean velocity between the zero-cross cycles, the instantaneous velocity at the detection point of the latest zero-cross cannot be accurately measured when acceleration is caused.

As described so far, the problems with the prior art are that the deceleration of the beam spot cannot be made high enough after a seek velocity control operation, and that the beam spot velocity used for pulse height correction cannot be accurately measured. Also, with a pulse width and pulse height determined by the equations (4) and (5), the resolution of the pulse width deteriorates due to the sampling, and the height of a deceleration pulse, i.e., the high acceleration á, results in unstable track pull-in operations.

SUMMARY OF THE INVENTION

A general object of the present invention is to provide information storage devices in which the above disadvantages are eliminated.

A more specific object of the present invention is to provide an information storage device which enables stable track pull-in operations.

According to the present invention, a deceleration pulse for instructing a tracking actuator to decelerate is supplied to the tracking actuator a plurality of times between a seek control operation and a tracking control operation. As the deceleration pulse is supplied the plurality of times, the amplitude of the deceleration pulse each time can be made small. Thus, enough deceleration can be obtained without applying a large amount of current.

Also in the present invention, the low frequency element is extracted from a seek control signal, and then is added to the deceleration pulse. Thus, low-frequency disturbance caused while outputting the deceleration pulse can be compensated beforehand, so that an accurate positioning operation can be performed.

Furthermore, according to the present invention, the movement velocity of the beam is measured, and the amplitude of the deceleration pulse to be supplied to the tracking actuator is determined as a linear function of the detected movement velocity. In this manner, noise in the movement velocity can be prevented from being amplified and then being added to the deceleration pulse. Thus, desired deceleration can be obtained, and an accurate positioning operation can be performed.

Also in the present invention, the deceleration pulse has a predetermined pulse width, so that the deceleration pulse is not influenced by resolution deterioration caused by sampling. Thus, desired deceleration can be achieved, and an accurate positioning operation can be performed.

The above and other objects and features of the present invention will become more apparent from the following description taken in conjunction with the accompanying drawings.

BRIEF DESCRIPTION OF THE DRAWINGS

FIG. 1 is a block diagram of an optical disk device of one embodiment of the present invention;

FIGS. 2A and 2B show the structure of an optical pickup and its surrounding parts of the embodiment of the present invention;

FIG. 3 is a block diagram of a deceleration pulse output circuit-of the embodiment of the present invention;

FIG. 4 is a table showing a selecting operation of a tracking selecting circuit of the embodiment of the present invention;

FIGS. 5A to 5J are timing charts showing an operation of the embodiment of the present invention.

DESCRIPTION OF THE PREFERRED EMBODIMENTS

Figure 6:
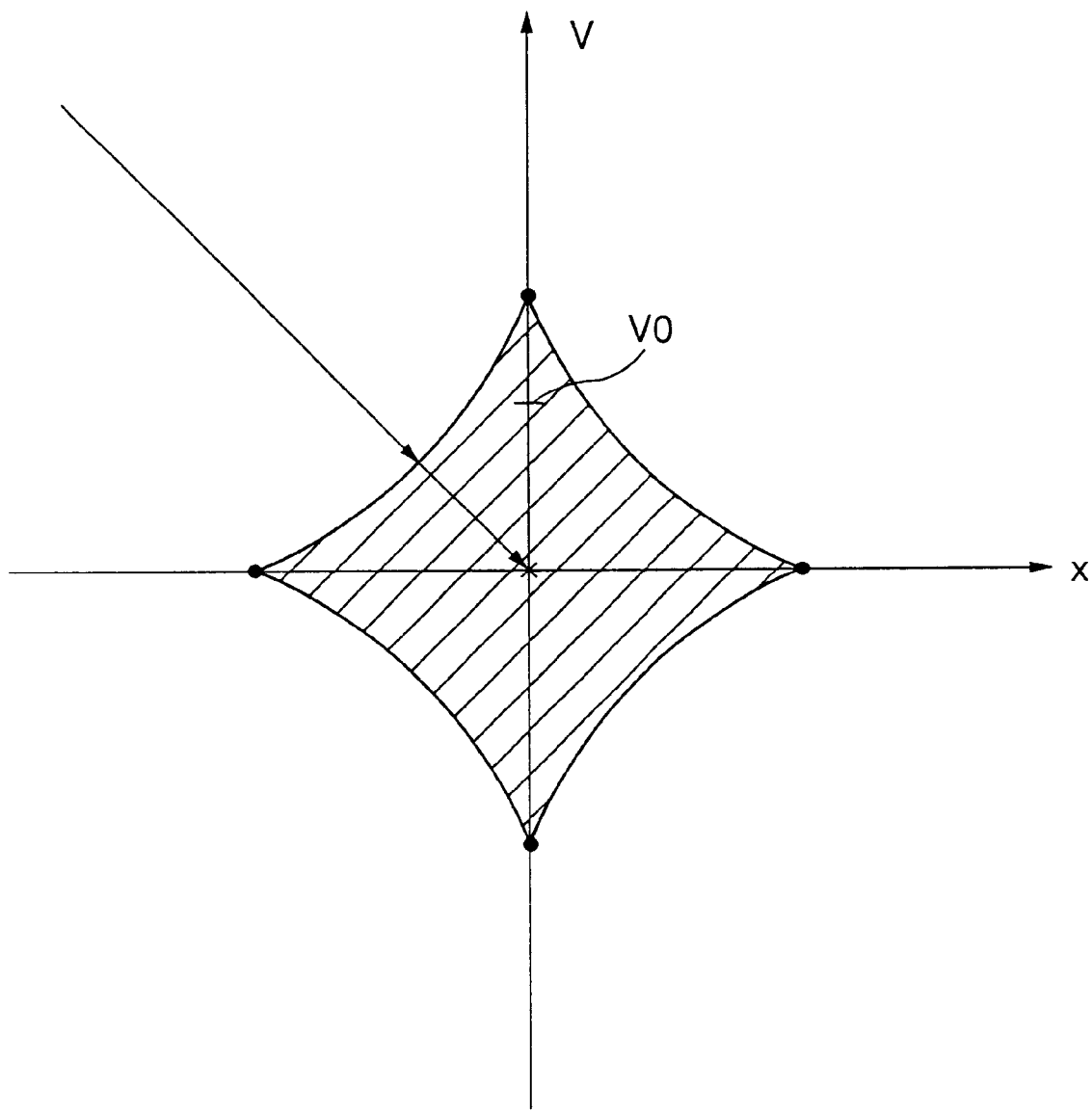
FIG. 6 illustrates a pull-in operation of the embodiment of the present invention.

The following is a description of embodiments of the present invention.

FIG. 1 is a block diagram of one embodiment of the present invention.

An optical disk device 1 comprises a spindle motor 2, an optical pickup 3, an optical system 4, a tracking control circuit 5, a focusing control circuit 6, and a signal processing circuit 7. The spindle motor 2 rotates an optical disk 8. The optical pickup 3 irradiates an optical beam 9 onto the optical disk 8 being rotated by the spindle motor 2. The optical pickup 3 can be moved radially by an actuator described below, so that the optical beam 9 can track a desired one of tracks formed on the optical disk 8.

The optical system 4 comprises a laser diode, an optical detecting device, and a prism. The optical system 4 supplies a laser beam to the optical pickup 3, and extracts a tracking error signal element, a focussing error signal element, and an information signal element from reflection light supplied via the optical pickup 3. The tracking error signal element extracted by the optical system 4 is supplied to the tracking control circuit 5. The focusing error signal element extracted by the optical system 4 is supplied to the focusing control circuit 6. The information signal element extracted by the optical system 4 is supplied to the signal processing circuit 7.

The tracking control circuit 5 detects the tracking error signal element supplied from the optical system 4, and controls movement of the optical pickup 3 in the radial direction of the optical disk 8 (a direction indicated by an arrow A).

FIG. 2A is a plan view of the structure of the optical pickup of the embodiment of the present invention, and FIG. 2B is a side view of the same.

The optical pickup 3 comprises a carriage 11, an objective lens 12, a reflection portion 13, a supporting plate spring 14, a focusing actuator 15, and voice coils 16. Being guided by rails 18 secured by a base 17, the carriage 11 can move in the direction of the arrow A.

The objective lens 12 is held slidably in the direction of an arrow B by the carriage 11 via the supporting plate spring 14.

The focusing actuator 15 is mounted on the carriage 11, and oscillates the objective lens 12 in the direction of the arrow B. The voice coils 16 are fixed to a side of the carriage 11.

The voice coils 16, together with permanent magnets 20 and yokes 19 fixed to the base 17 along the rails 18, constitute a tracking actuator. By applying current to the voice coil 16, the carriage moves in the direction of the arrow A.

Referring back to FIG. 1, the tracking control circuit 5 will be described below.

As shown in FIG. 1, the tracking control circuit 5 comprises a tracking error signal detecting circuit 21, a track following control circuit 22, a velocity control circuit 23, a deceleration control circuit 24, a tracking selecting circuit 25, a command control circuit 26, and a driver circuit 27.

The tracking error signal detecting circuit 21 generates a tracking error signal TES from a signal supplied from the optical system 4. The tracking error signal TES generated by the tracking error detecting circuit 21 is supplied to the track following control circuit 22 and the velocity control circuit 23.

In accordance with the tracking error signal TES supplied from the tracking error signal detecting circuit 21, the track following control circuit 22 generates a track following control signal TRKDRV for driving the optical pickup 3 to follow along a desired track, and supplies the track following control signal TRKDRV to the tracking selecting circuit 25.

The velocity control circuit 23 counts the number of jump tracks from the tracking error signal, and generates a seek velocity control signal SEEKDRV for a target position. The seek velocity control signal SEEKDRV generated by the velocity control circuit 23 is supplied to the tracking selecting circuit 25.

The tracking selecting circuit 25 selects the track following control signal TRKDRV or the seek velocity control signal SEEKDRV. More specifically, the tracking selecting circuit 25 selects the track following control signal TRKDRV to follow along a desired track, and selects the seek velocity control signal SEEKDRV to perform a seek operation.

The selected signal TDRV selected by the tracking selecting circuit 25 is supplied to the driver circuit 27. In accordance with the selected signal TDRV selected by the tracking selecting circuit 25, the driver circuit 27 supplies driving current to the voice coils 16 of the optical pickup 3. The optical pickup 3 is thus driven in the direction of the arrow A with the driving current supplied from the driver circuit 27 to the voice coils 16.

Referring back to FIG. 1, the velocity control circuit 23 comprises a track zero-cross detecting circuit 28, a track zero-cross counter circuit 29, a velocity detecting circuit 30, a target velocity generating circuit 31, a subtracter 32, and a seek control circuit 33.

The track zero-cross detecting circuit 28 detects the zero-cross point of the tracking error signal TES generated by the tracking error signal detecting circuit 21, and generates a zero-cross pulse signal TZC in accordance with the detected zero-cross point. The zero-cross pulse signal TZC generated by the track zero-cross detecting circuit 28 is supplied to the track zero-cross counter circuit 29 and the velocity detecting circuit 30.

The track zero-cross counter circuit 29 counts the zero-cross pulse signals TZC supplied from the track zero-cross detecting circuit 28, and outputs a count value TRKCN. The count value TRKCN of the track zero-cross counter circuit 29 is supplied to the target velocity generating circuit 31. The target velocity generating circuit 31 generates target velocity information from the count value TRKCN of the track zero-cross counter circuit 29.

The velocity detecting circuit 30 generates optical beam movement velocity information SEEKVEL in accordance with the zero-cross pulse signal TZC supplied from the track zero-cross detecting circuit 28.

The subtracter 32 subtracts the movement velocity information SEEKVEL generated by the velocity detecting circuit 30 from the target velocity information supplied from the target velocity generating circuit 31. The output signal of the subtracter 32 is the difference between the target velocity and the actual movement velocity, i.e., a seek velocity error signal.

The seek velocity error signal is supplied to the seek control circuit 33. The seek control circuit 33 phase-compensates the seek velocity error signal supplied from the subtracter 32 so as to obtain the seek velocity control signal SEEKDRV.

The seek velocity control signal SEEKDRV obtained by the seek control circuit 33 is supplied to the tracking selecting circuit 25. The optical pickup 3 is driven in accordance with the seek velocity control signal SEEKDRV, and is thus driven in accordance with a predetermined velocity profile.

As shown in FIG. 1, the deceleration control circuit 24 comprises a deceleration pulse output circuit 34, a target track number comparator 35, a low-frequency element extracting circuit 36, a switching circuit 37, an adder 38, a timer 39, and an output controller 40.

The deceleration pulse output circuit 34 receives the movement velocity information SEEKVEL from the velocity detecting circuit 30, and is also supplied with a clock signal CLK from the target track number comparator 35. The deceleration pulse output circuit 34 generates a deceleration pulse in accordance with the movement velocity information SEEKVEL, and outputs the deceleration pulse in accordance with the clock signal CLK.

FIG. 3 is a block diagram of the deceleration pulse output circuit of the embodiment of the present invention.

The deceleration pulse output circuit 34 comprises a subtracter 41, a velocity offset setting unit 42, a multiplier 43, and a latch signal generating unit 44. The subtracter 41 receives the movement velocity information SEEKVEL from the velocity detecting circuit 30, and is also supplied with a velocity offset value V0 from the velocity offset setting unit 42. The velocity offset value V0 is preset in the velocity offset setting unit 42. The velocity offset value V0 is set so that a pull-in operation can be performed after a seek control operation. The subtracter 41 subtracts the velocity offset value V0 from the movement velocity information SEEKVEL.

The output signal of the subtracter 41 is supplied to the multiplier 43. The multiplier 43 multiples the output signal of the subtracter 41 by a predetermined constant K, and outputs the result as a deceleration pulse signal. Accordingly, an output deceleration pulse á of the deceleration pulse output circuit 34 can be expressed as:

$$á = K(V - V0) \tag{6}$$

wherein V is the current movement velocity, V0 is the velocity offset value, and K is the constant.

The output signal á of the deceleration pulse output circuit 34 represents the pulse height, which determines the deceleration of the optical pickup 3.

The deceleration pulse generated by the deceleration pulse output circuit 34 is supplied to the switching circuit 37. The switching circuit 37 controls the output of the deceleration pulse output circuit 34, in accordance with the clock signal CLK outputted from the target track number comparator 35 and a timing signal outputted from the timer 39. The deceleration pulse output circuit 34 can arbitrarily set the deceleration pulse á, depending on the clock signal CLK. For instance, when a first clock signal CLK is supplied the deceleration pulse output circuit 34 outputs a deceleration pulse a1, and when a second clock signal CLK is supplied, the deceleration pulse output circuit 34 outputs a deceleration pulse á2. The deceleration pulse aá1 and deceleration pulse á2 can be arbitrarily set.

The latch signal generating unit 44 is supplied with a clock signal CLK outputted from the target track number comparator 35 when the number of tracks reaches the target number. The latch signal generating unit 44 then detects the initial rise of the clock signal CLK, and generates a latch signal LATCH. The latch signal LATCH generated by the latch signal generating unit 44 is supplied to the low frequency element extracting circuit 36.

The low frequency element extracting circuit 36 receives the latch signal LATCH from the deceleration pulse output circuit 34, and is also supplied with the seek control signal SEEKDRV generated by the seek control circuit 33. The low frequency element extracting circuit 36 extracts a low frequency element signal CSTDRV from the seek control signal SEEKDRV supplied from the seek control circuit 33, and latches the extracted low frequency element signal CSTDRV at the timing of the latch signal LATCH. The low frequency element signal CSTDRV latched by the low frequency element extracting circuit 36 is supplied to the adder 38.

The target track number comparator 35 outputs a clock signal CLK, and generates a pull-in control signal PULLIN that changes to the low-level when the count value TRKCNT outputted from the track zero-cross counter circuit 29 of the velocity control circuit 23 reaches a value predetermined in accordance with the number of tracks existing before a target position. The pull-in control signal PULLIN generated by the target track number comparator 35 is supplied to the output controller 40. The clock signal CLK generated by the target track number comparator 35 is supplied to the deceleration pulse output circuit 34, the switching circuit 37, and the timer 39. The clock signal CLK outputted from the target track number comparator 35 is used as a start-up signal for the timer 39.

The timer 39 is started when the clock signal CLK supplied from the target track number comparator 35 changes from the low level to the high level. After a predetermined period of time has passed, the timer 39 inverses the output from the low level to the high level. Two types of clock time t0 and t10 are set in the timer 39. Upon receipt of a first clock signal CLK, the output is inversed during the clock time t0, and upon receipt of a second clock signal CLK, the output is inversed during the clock time t10. When receiving a clock signal CLK, the timer 39 resets the output to the low-level. The output signal of the timer 39 is used as a stop signal STOP for stopping deceleration pulse output.

The stop signal STOP is supplied to the switching circuit 37 and the output controller 40. The switching circuit 37 switches the deceleration pulse output of the deceleration pulse output circuit 34 in accordance with the clock signal CLK outputted from the target track number comparator 35 and the stop signal STOP outputted from the timer 39.

The output of the switching circuit 37 is supplied to the adder 38. The adder 38 adds the low frequency element CSTDRV extracted by the low frequency element extracting circuit 36 to the deceleration pulse generated by the deceleration pulse output circuit 34 when the switching circuit 37 outputs a deceleration pulse. The addition result is supplied to the tracking selecting circuit 25. When the switching circuit 37 stops the deceleration pulse output, only the low frequency element CSTDRV extracted by the low frequency element extracting circuit 36 is supplied to the tracking selecting circuit 25.

The output controller 40 is an irreversible rotary switch which outputs a select control signal SELCNT at levels "0", "1", "2", and "0", in this order, in accordance with a command signal supplied from the command control circuit 26, the pull-in signal PULLIN generated by the target track number comparator 35, and the stop signal STOP generated by the timer 39.

The output controller 40 changes the select control signal SELCNT from "0" to "1" when the command signal TRKCOM outputted from the command control circuit 26 is inversed from the low level to the high level. The output controller 40 changes the selection control signal SELCNT from "1" to "2" when the pull-in signal PULLIN generated by the target track number comparator 35 is inversed from the low level to the high level. Further, the output controller 40 changes the selection control signal SELCNT from "2" to "0" when the pull-in signal PULLIN generated by the target track number comparator 35 is low and the stop signal STOP generated by the timer 39 is inversed from the low level to the high level. The select control signal SELCNT generated by the output controller 40 is supplied to the tracking selecting circuit 25.

FIG. 4 is a table for explaining a selecting operation of the tracking selecting circuit 25 of the embodiment of the present invention.

The tracking selecting circuit 25 selects the track following control signal TRKDRV generated by the track following control circuit 22, the seek control signal SEEKDRV generated by the seek control circuit 33, or a deceleration pulse signal PULLINDRV, in accordance with the command signal TRKCOM supplied from the command control circuit 26 and the select control signal SELCNT supplied from the output controller 40. When the command signal TRKCOM supplied from the command control circuit 26 is low, the tracking selecting circuit 25 selects the track following control signal TRKDRV generated by the track following control circuit 22 regardless of the output of the output controller 40. On the other hand, when the command signal TRKCOM supplied from the command control circuit 26 is high, the tracking selecting circuit 25 selects the track following control signal TRKDRV generated by the track following control circuit 22, the seek control signal SEEKDRV generated by the seek control circuit 33, or the deceleration pulse signal PULLINDRV, in accordance with the select control signal SELCNT supplied from the output controller 40. When the command control signal TRKCOM supplied from the command control circuit 26 is high and the select control signal SELCNT outputted from the output controller 40 is "1", the tracking control circuit 25 selects and outputs the seek control signal SEEKDRV generated by the seek control circuit 33. The tracking control signal TDRV selected by the tracking selecting circuit 25 is supplied to the optical pickup 3 via the driver circuit 27, so that the optical pickup 3 is driven in accordance with the tracking control signal TRDV selected by the tracking selecting circuit 25.

FIGS. 5A to 5J are timing charts of operations in the embodiment of the present invention. FIG. 5A shows the tracking error signal TES generated by the tracking error signal detecting circuit 21, FIG. 5B shows the zero-cross pulse TZC detected by the zero-cross detecting circuit 28, FIG. 5C shows the number of tracks before the target position determined by subtracting the count value TRKCNT from the target track number, FIG. 5D shows the movement velocity information SEEKVEL generated by the velocity detecting circuit 30, FIG. 5E shows the seek control signal SEEKDRV generated by the seek control circuit 33, FIG. 5F shows the pull-in signal PULLIN generated by the target track number comparator 35, FIG. 5G shows the stop signal STOP generated by the timer 39, FIG. 5H shows the select control signal SELCNT generated by the output controller 40, FIG. 5I shows the clock signal CLK generated by the target track number comparator 35, and FIG. 5J shows the latch signal LATCH generated by the deceleration pulse output circuit.

When the command signal TRKCOM outputted from the command control circuit 26 is high and the number of tracks before the target positions has not been reduced to a predetermined value, i.e., during a time T1, the select control signal SELCNT outputted from the output controller 40 is "1", as shown in FIG. 5H. While the select control signal SELCNT is "1", the tracking select control circuit 25 selects and outputs the seek control signal SEEKDRV generated by the seek control circuit 33.

At a timing t1, the number of tracks before the target position becomes smaller than the predetermined value, and the target track number comparator 35 outputs a clock signal CLK, as shown in FIG. 5I. In response to the first clock signal CLK shown in FIG. 5I, the deceleration pulse output circuit 34 supplies the latch signal LATCH to the low frequency element extracting circuit 36, as shown in FIG. 5J. In accordance with the latch signal LATCH shown in FIG. 5J, the low frequency element extracting circuit 36 latches the low frequency element of the seek control signal SEEKDRV. The clock CLK also starts the timer 39.

At the timing t1, the target track number comparator 35 inverses the pull-in signal PULLIN from the low level to the high level, as shown in FIG. 5F. As the pull-in signal PULLIN outputted from the target track comparator 35 becomes high, the output controller 40 changes the select control signal SELCNT to "2", as shown in FIG. 5H. As the select control signal SELCNT becomes "2", the tracking selecting circuit 25 selects the output of the adder 38, i.e., the deceleration pulse signal PULLINDRV. At this point, the switching circuit 37 outputs an output deceleration pulse from the deceleration pulse output circuit 34. When the first clock signal CLK is supplied, the deceleration pulse output circuit 34 outputs an output deceleration pulse having a pulse height of á1.

The adder 38 adds the low frequency element CSTDRV extracted by the low frequency element extracting circuit 36 to the output signal of the deceleration pulse output circuit 34, and outputs the addition result. Accordingly, the output signal TDRV of the tracking selecting circuit 25 takes a waveform as shown in FIG. 5E.

When the timer 39 moves to a timing t2 after the predetermined clock time t0 has passed since the timing t1, the stop signal STOP generated by the timer 39 becomes high, as shown in FIG. 5G. As the stop signal STOP outputted from the timer 39 becomes high, the switching circuit 37 is switched off, and the adder 38 outputs only the low frequency element CSTDRV extracted by the low frequency element extracting circuit 36. At this point, the select control signal SELCNT outputted from the output controller 40 is maintained at "2". Accordingly, the output signal TDRV of the tracking selecting circuit 25 is the output signal of the adder 38, i.e., the low frequency element CSTDRV extracted by the low frequency element extracting circuit 36, as shown in FIG. 5E.

In the above manner, a signal having a pulse width t0 and a pulse height (á1+CSTDRV) is outputted as the deceleration pulse signal PULLINDRV.

When the number of tracks reduces by 1 due to the movement of the optical pickup 3 at a timing t3, the target track number comparator 35 changes the pull-in signal PULLIN to the low level as shown in FIG. 5F, and outputs a clock signal CLK as shown in FIG. 5I. The clock signal CLK starts the timer 39. The timer 39 clocks a clock time t10 different from the clock time t0 of the previous operation.

When the timer 39 moves to a timing t4 after the predetermined clock time t10 has passed since the timing t3, the stop signal STOP generated by the timer 39 becomes high as shown in FIG. 5G. As the stop signal STOP becomes high, the select control signal SELCNT outputted from the output controller 40 becomes "0". While the select control signal SELCNT is "0", the tracking selecting circuit 25 selects the track following signal TRKDRV outputted from the track following control circuit 22, thereby performing a track following operation.

In the above manner, a signal having a pulse width t10 and a pulse height (á2+CSTDRV) is outputted as the deceleration pulse signal PULLINDRV.

The operation moves from the seek control operation to the deceleration control operation to the track following operation, as described above. Also, there are two types of deceleration pulse signals PULLINDRV: a first deceleration pulse signal has the pulse width t0 and the pulse height (á1+CSTDRV); and a second deceleration pulse signal has the pulse width t10 and the pulse height (á2+CSTDRV). Here, the clock times t0 and t10, and the pulse heights á1 and á2 can be arbitrarily set, depending on clock signal input. By outputting a deceleration pulse several times, the pulse height of each deceleration can be made lower and thus optimized. Also, the pulse width can be set so as not to have an adverse influence on sampling, and a decelerating operation can thus be performed with a suitable deceleration pulse.

The deceleration pulse output circuit 34 determines a deceleration from a linear function expressed by the equation (6) using the present moving velocity. The parameter K and the velocity offset V0 in the equation (6) are set as follows.

Using the equation (6), the deceleration pulse height á can be expressed as:

$$á=K(V-V0)$$

The deceleration pulse width t can be expressed as:

$$t=nΔt$$

wherein Δt is the sampling cycles, and n is the number of sampling cycles to which the deceleration pulse is applied.

Since a velocity V1 after the deceleration pulse output is V1=V+át, the velocity V1 can also be expressed as:

$$V1=V+Kt(V-V0) \quad (7)$$

Wherein V is the seek velocity SEEKVEL at the time of moving to the track pull-in control operation, and t is the deceleration pulse applying time.

The equation (7) can be changed to:

$$V-V1=Kt(V-V0)$$

Accordingly, with V0=V1 and K=1/t, the pulse width is invariably t=nΔt regardless of the value of the seek velocity V. Thus, the pulse height á can be determined by K(V−V0), V0 being the velocity after the pulse output.

The deceleration pulse width t may be arbitrarily determined, but it is preferable to have the beam spot within a TES linear region surrounding a target track, as shown by a shaded portion in FIG. 6, at the time of moving to the tracking control operation. After the deceleration pulse is outputted a predetermined number of tracks before the target track in the optical disk 8, the distance between the beam spot and the center point of the target track is expressed as:

$$x=md-[Vt+(½)át^2]$$

Accordingly, the deceleration pulse width t should be set so that the value x can be within the peak range of the tracking error signal, i.e., the deceleration pulse width t should be set at $|x|<(d/4)$.

For instance, the control sampling period 1/Δt is set at 60 kHz, the track width d of the optical disk 8 is 1.1 μm, the threshold value of the target track number comparator 35 is [(the target number of tracks)−0.5], the velocity offset V0 of the deceleration pulse output circuit 34 is 0 mm/s, the deceleration pulse gain K is −3669 (m/s$^2$)/(m/s), and the deceleration pulse width t is 117 μs (7Δt). In such a case, if the seek velocity SEEKVEL is set at 8 mm/s at the time of moving to the track pull-in control operation, the height á of the deceleration pulse generated by the deceleration pulse output circuit 34 can be expressed as:

$$á=K(V-V0)=-69 m/s^2$$

and the velocity V1 after the pulse output can be expressed as:

$$V1=V+át=0(mm/s)$$

In this manner, the height á of the deceleration pulse can be expressed by a linear function which is little influenced by a velocity detection error. Also, since the deceleration pulse width T is given a contact value not influenced by a resolution deterioration caused by sampling, the deceleration pulse can be outputted. Thus, when moving from the seek control operation to the tracking control operation, no residual velocity is caused, and a stable tracking control operation can be performed.

The present invention is not limited to the specifically disclosed embodiments, but variations and modifications may be made without departing from the scope of the present invention.

The present application is based on Japanese priority application No. 11-093547, filed on Mar. 31, 1999, the entire contents of which are hereby incorporated by reference.

What is claimed is:

1. An information storage device comprising:
   a tracking actuator which moves a carriage to track and follow a target track;
   a deceleration pulse generating unit which generates a deceleration pulse; and
   a deceleration control unit which supplies the deceleration pulse to the tracking actuator a plurality of times between a seek control operation for seeking a target track and a tracking control operation for scanning the target track with a light beam.

2. The information storage device as claimed in claim 1, wherein the tracking actuator performs both the seek control operation and the tracking control operation.

3. The information storage device as claimed in claim 1, wherein a pulse height of said deceleration pulse is dependent on a seek speed.

4. The information storage device as claimed in claim 1, wherein said deceleration pulse has a predetermined pulse width.

5. An information storage device comprising:
   a tracking actuator;
   a deceleration pulse generating unit which generates a deceleration pulse;
   a deceleration control unit which supplies the deceleration pulse to the tracking actuator a plurality of times between a seek control operation for seeking a target track and a tracking control operation for scanning the target track with a light bean;
   a seek control signal generating unit which generates a seek control signal for controlling the tracking actuator so that the beam moves at a predetermined velocity;
   a low frequency element extracting unit which extracts a low frequency element from the seek control signal by the low frequency element extracting unit to the deceleration pulse.

6. An information storage device comprising:
   a tracking actuator;
   a deceleration pulse generating unit which generates a deceleration pulse; and
   a deceleration control unit which supplies the deceleration pulse to the tracking actuator a plurality of times between a seek control operation for seeking a target track and a tracking control operation for scanning the target track with a light beam;
   wherein said deceleration pulse generating unit detects a movement velocity of the beam, and determines an amplitude of the deceleration pulse to be supplied to the tracking actuator as a linear function of the detected movement velocity, and
   the deceleration pulse generating unity comprises a multiplying unit which multiples the detected movement velocity by a predetermined constant.

7. The information storage device as claimed in claim 6, wherein the deceleration pulse generating unit further comprises an adding unit which adds a predetermined offset value to the detected movement velocity, and supplies the addition result to the multiplying unit.

8. The information storage device as claimed in claim 6, wherein the deceleration pulse generating unity outputs the deceleration pulse having a predetermined constant pulse width.

9. An information storage device comprising:
   a tracking actuator which moves a carriage to track and follow a target track;
   deceleration pulse generating means for generating a deceleration pulse; and
   a deceleration control unit, responsive to said deceleration pulse generating means, for supplying the deceleration pulse to said tracking actuator a plurality of times between a seek control operation which seeks the target track on a recording medium and a tracking control operation which scans the target track by a light beam.

10. The information storage device as claimed in claim 9, wherein a pulse height of said deceleration pulse is dependent on a seek speed.

11. The information storage device as claimed in claim 9, wherein said deceleration pulse has a predetermined pulse width.

* * * * *

UNITED STATES PATENT AND TRADEMARK OFFICE
CERTIFICATE OF CORRECTION

PATENT NO. : 6,724,698 B1
DATED : April 20, 2004
INVENTOR(S) : Kawabe et al.

It is certified that error appears in the above-identified patent and that said Letters Patent is hereby corrected as shown below:

<u>Title page,</u>
Item [54], Title, please delete "DECELARATION" and insert -- DECELERATION -- in its place, therefor.

<u>Column 12,</u>
Line 12, please delete "bean;" and insert -- beam; -- in its place, therefor.
Line 38, please delete "multiples" and insert -- multiplies -- in its place, therefor.
Line 46, please delete "unity" and insert -- unit -- in its place, therefor.

Signed and Sealed this

Nineteenth Day of October, 2004

JON W. DUDAS
*Director of the United States Patent and Trademark Office*